United States Patent
Oshima

(10) Patent No.: US 8,762,099 B2
(45) Date of Patent: Jun. 24, 2014

(54) MEASUREMENT METHOD AND MEASUREMENT APPARATUS

(75) Inventor: Yuki Oshima, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 323 days.

(21) Appl. No.: 12/716,699

(22) Filed: Mar. 3, 2010

(65) Prior Publication Data

US 2010/0228519 A1  Sep. 9, 2010

(30) Foreign Application Priority Data

Mar. 3, 2009 (JP) ................................. 2009-049734

(51) Int. Cl.
*G01B 15/00*  (2006.01)

(52) U.S. Cl.
USPC ........... 702/155; 702/156; 702/157; 702/158; 702/159; 702/167; 702/172; 702/199

(58) Field of Classification Search
USPC ......... 702/155, 156, 157, 158, 159, 167, 172, 702/199
See application file for complete search history.

(56) References Cited

U.S. PATENT DOCUMENTS

| | | | |
|---|---|---|---|
| 6,611,791 B1 * | 8/2003 | Kase et al. ..................... | 702/167 |
| 6,956,657 B2 * | 10/2005 | Golini et al. .................. | 356/512 |
| 7,221,461 B2 * | 5/2007 | Evans ............................ | 356/511 |
| 7,593,599 B2 * | 9/2009 | Lee et al. ...................... | 382/284 |
| 2008/0018910 A1 * | 1/2008 | Neal et al. ..................... | 356/601 |
| 2008/0043247 A1 * | 2/2008 | Arnold et al. ................. | 356/512 |
| 2009/0251702 A1 * | 10/2009 | Murphy et al. ............... | 356/450 |

FOREIGN PATENT DOCUMENTS

| JP | 11-037732 A | 2/1999 |
|---|---|---|
| JP | 2000-337862 A | 12/2000 |
| JP | 2001-066123 A | 3/2001 |
| JP | 3162355 B2 | 4/2001 |

\* cited by examiner

*Primary Examiner* — Jonathan C. Teixeira Moffat
*Assistant Examiner* — Hyun Park
(74) *Attorney, Agent, or Firm* — Rossi, Kimms & McDowell LLP

(57) ABSTRACT

A measurement method of the present invention is a measurement method which measures a target divided into a plurality of partial regions to measure a whole shape of the target by stitching the plurality of partial regions. The measurement method comprises Steps S501 to S511 which measures a plurality of partial regions, Step S102 which determines an error in a partial region that is a reference, Step S105 which calculates each of errors in the plurality of partial regions, and Step S107 which performs a correction depending on each of the errors to stitch the plurality of partial regions. Steps S102 to S107 are repeatedly performed by changing the partial region that is the reference (S110).

9 Claims, 8 Drawing Sheets

MEASUREMENT METHOD AND MEASUREMENT APPARATUS

BACKGROUND OF THE INVENTION

1. Field of the Invention

The present invention relates to a measurement method which measures a target divided into a plurality of partial regions to measure a whole shape of the target by stitching these partial regions.

2. Description of the Related Art

Previously, in order to measure a shape of a target, there has been a method called stitching which measures the target divided into a plurality of partial regions having an overlapped region to stitch these partial regions. For example, as shown in FIG. 8, the target is measured by being divided into partial regions surrounded with four circles (1) to (4) indicated by dotted lines. The shape of the target is measured by stitching the divided and measured partial regions. However, there is a problem that an error is generated in performing the stitching.

The error in performing the stitching is roughly caused by two reasons. One is an error corresponding to a position change of the target when each partial region is measured (a setting error). The setting error has different value for each partial region, and corresponds to a lower-order error. The other is an error that is specific in a measurement device used when each partial region is measured (a system error). The system error has a common value for all partial regions, and corresponds to a relatively higher-order error.

FIGS. 9A and 9B are illustrations of a stitching error in an overlapped region of partial regions. For example, when the system error is not contained, as shown in FIG. 9A, overlapped regions of partial regions adjacent to each other have an identical shape. Therefore, the overlapped regions can be strictly coincident with each other if the position relation between the partial regions adjacent to each other. However, when the system error is contained, as shown in FIG. 9B, overlapped regions adjacent to each other do not have an identical shape. Therefore, even when the position relation between the partial regions adjacent to each other is aligned, these positions can not be strictly coincident with each other. As a result, a stitching error is generated.

As a method of correcting these errors, for example Japanese Patent No. 3162355 discloses a method of performing a coordinate conversion of measurement data of each partial region so that one of the measurement data of overlapped regions of two partial regions fits the other measurement data. Japanese Patent Laid-open No. 2001-66123 discloses a method of extracting only shape components of high frequency to perform a stitching so that two shape components of high frequency in overlapped regions are coincident with each other. U.S. Pat. No. 6,956,657 discloses a method of performing a correction so that a free compensator (corresponding to a setting error) and an interlocked compensator (corresponding to a system error) are entirely optimized. These error corrections enables highly accurate stitching.

However, in a conventional technology, a partial region that is a reference is determined and the stitching is performed so that the partial region fits another partial region. In other words, the setting error in the partial region that is a reference is fixed and the setting error of other partial regions is variable to align the reference partial region with other partial regions. Therefore, the calculation result contains the influences of the setting error of the reference partial region. Because the setting errors are different for partial regions and correspond to variability of the calculation results, there was a problem that it influences the measurement accuracy.

BRIEF SUMMARY OF THE INVENTION

The present invention provides a measurement method capable of performing a stitching calculation with high accuracy.

A measurement method as one aspect of the present invention measures a target divided into N partial regions ("N" is an integer of at least 2) to measure a whole shape of the target by stitching the N partial regions. The measurement method comprises a partial region measurement step which measures the N partial regions so that one of the N partial regions includes an overlapped region with at least one of the other N−1 partial regions, a reference determination step which determines an error caused by a position variability in measuring an i-th partial region ("i" is an integer between 1 and N) of the N partial regions, an error calculation step which calculates errors caused by the position variability in measuring N−1 partial regions other than the i-th partial region and error caused by a measurement apparatus common to the N partial regions, and a stitching step which performs a correction depending on each error calculated by the error calculation step to stitch the N partial regions. The reference determination step, the error calculation step, and the stitching step are repeatedly performed M ("M" is an integer between 2 and N) times by changing the i.

A measurement apparatus as another aspect of the present invention is configured to measure a whole shape of a target, and comprises a measurement unit configured to perform a measurement method of measuring the target divided into N partial regions ("N" is an integer of at least 2) to measure the whole shape of the target by stitching the N partial regions. The measurement method comprises a partial region measurement step which measures the N partial regions so that one of the N partial regions includes an overlapped region with at least one of the other N−1 partial regions, a reference determination step which determines an error caused by a position variability in measuring an i-th partial region ("i" is an integer between 1 and N) of the N partial regions, an error calculation step which calculates errors caused by the position variability in measuring N−1 partial regions other than the i-th partial region and error caused by a measurement apparatus common to the N partial regions, and a stitching step which performs a correction depending on each error calculated by the error calculation step to stitch the N partial regions. The reference determination step, the error calculation step, and the stitching step are repeatedly performed M ("M" is an integer between 2 and N) times by changing the i.

Further features and aspects of the present invention will become apparent from the following description of exemplary embodiments with reference to the attached drawings.

DETAILED DESCRIPTION OF THE PREFERRED EMBODIMENTS

Figure 1:
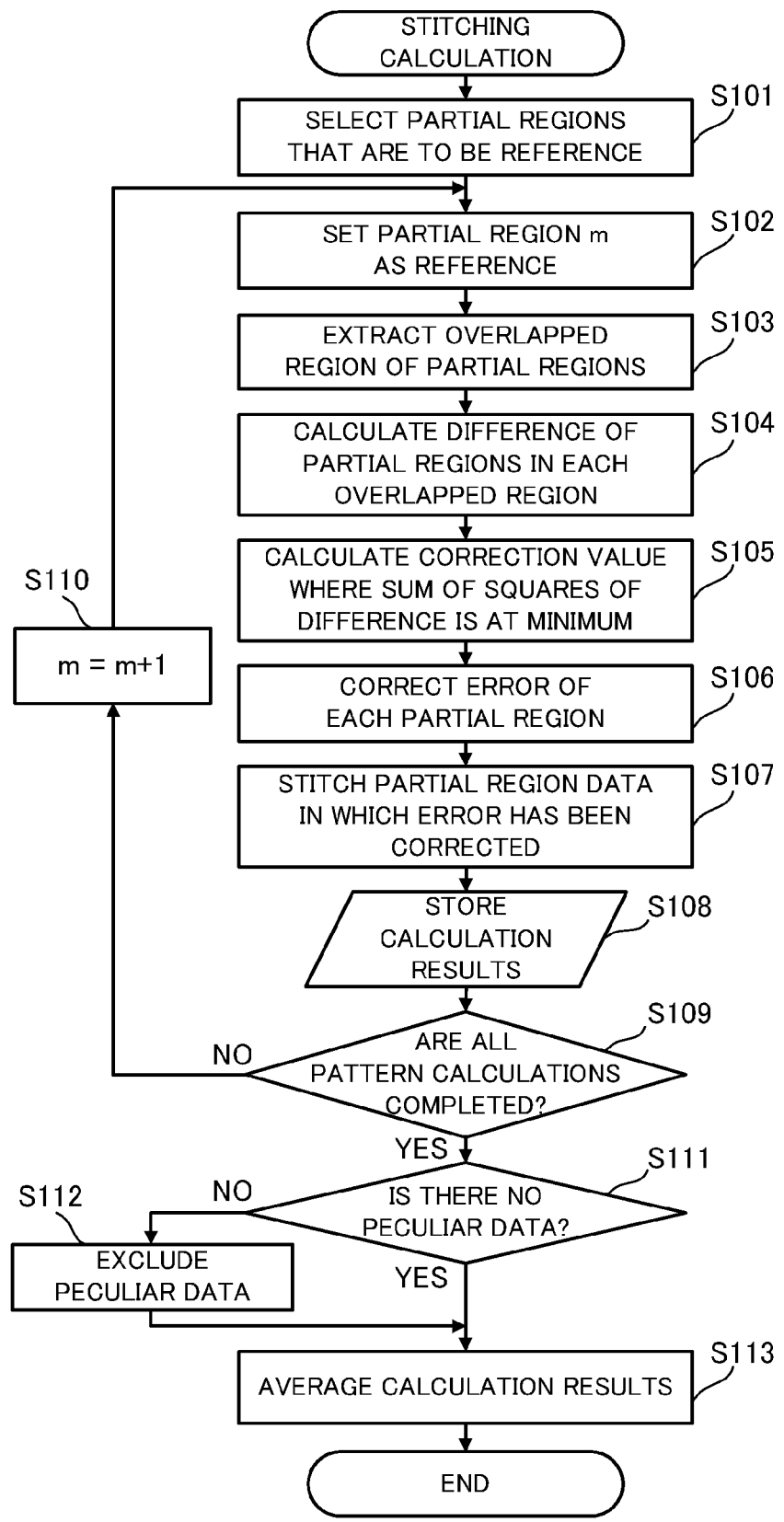
FIG. 1 is a flowchart of a stitching calculation in a measurement method of Embodiment 1.

Exemplary embodiments of the present invention will be described below with reference to the accompanied drawings. In each of the drawings, the same elements will be denoted by the same reference numerals and the duplicate descriptions thereof will be omitted.

The measurement method of the present embodiment can be mainly separated into two parts consisting of a partial region measurement part which measures a plurality of partial regions and a stitching calculation part. Therefore, the present embodiment will be described the partial region measurement part and the stitching calculation part separately.

With regard to the partial region measurement part, for example the measurement is performed by an interferometer. FIG. 5 is a configuration diagram of an interferometer 1 in the present embodiment. The interferometer 1 is a so-called Fizeau type interferometer. The interferometer 1 has a quasi-monochromatic light source S. Light emitted from the light source S is collected on a pinhole PH by a lens L1. The light transmitted through the pinhole PH is diverged and transmits through a beam splitter BS to be parallel light by a collimater lens CL. Apart of the parallel light is reflected by a reference sherical wave forming lens TS to be reflected light, and the rest transmits through the reference spherical wave forming lens TS to be transmitted light. In the present embodiment, the reflected light is reference light and the transmitted light is test light.

The reference light reflected on the reference spherical wave forming lens TS is reflected on the beam splitter BS to pass through a lens L2 to enter an image pickup element C. On the other hand, the test light transmitted through the reference spherical wave forming lens TS enters a target T to be reflected. The light reflected on the target T transmits through the reference spherical wave forming lens TS and the collimater lens CL. After the light is reflected on the beam splitter BS, it passes through the lens L2 to enter the image pickup element C.

Because the reference light reflected on the reference spherical wave forming lens TS and the test light transmitted through the reference spherical wave forming lens TS to be reflected on the target T have coherency, an interference pattern is formed on the image pickup element C. A shape of the target T can be recognized by analyzing the formed interference pattern. In FIG. 5, the target T has a nonplanar shape, but the present embodiment is not limited to this. When the target T has a planar shape, a reference plane wave forming lens TF (not shown), instead of the reference spherical wave forming lens TS, may be used so that the reference wave becomes a plane wave.

The measurement apparatus in the present embodiment is not limited to a non-contact type measurement apparatus such as an interferometer. For example, a contact type measurement apparatus can also be used. FIG. 6 is a configuration diagram of the contact type measurement apparatus in the present embodiment. As shown in FIG. 6, the contact type measurement apparatus traces the target T with a probe P to measure a shape of the target T. The measurement method of the present embodiment can also be performed by using a device such as a laser length measurement device or CCH (Computer-generated Holograms).

Figure 5A:
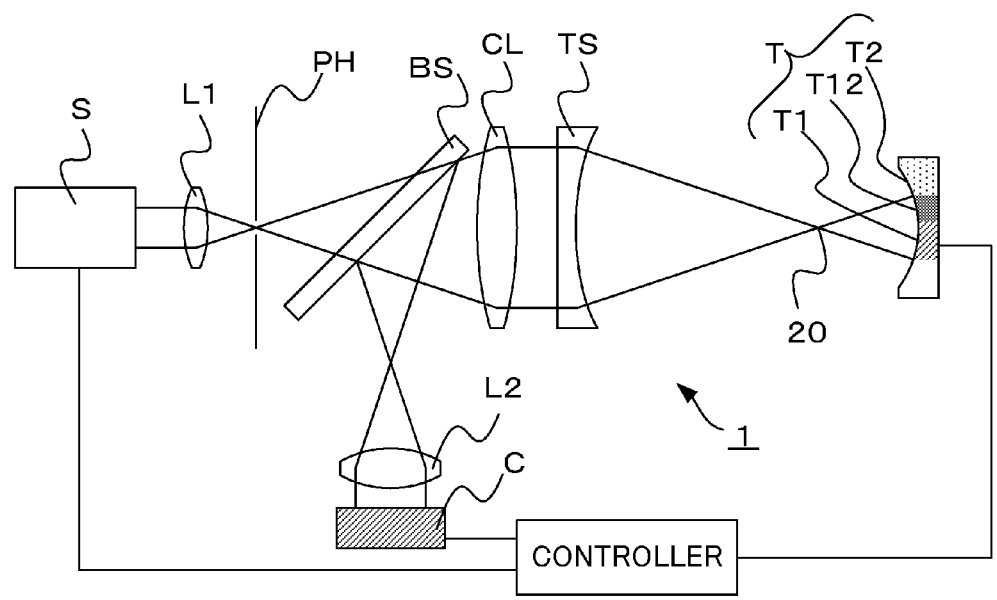
FIGS. 5A and 5B are configuration diagrams of an interferometer in the present embodiment.
Figure 5B:
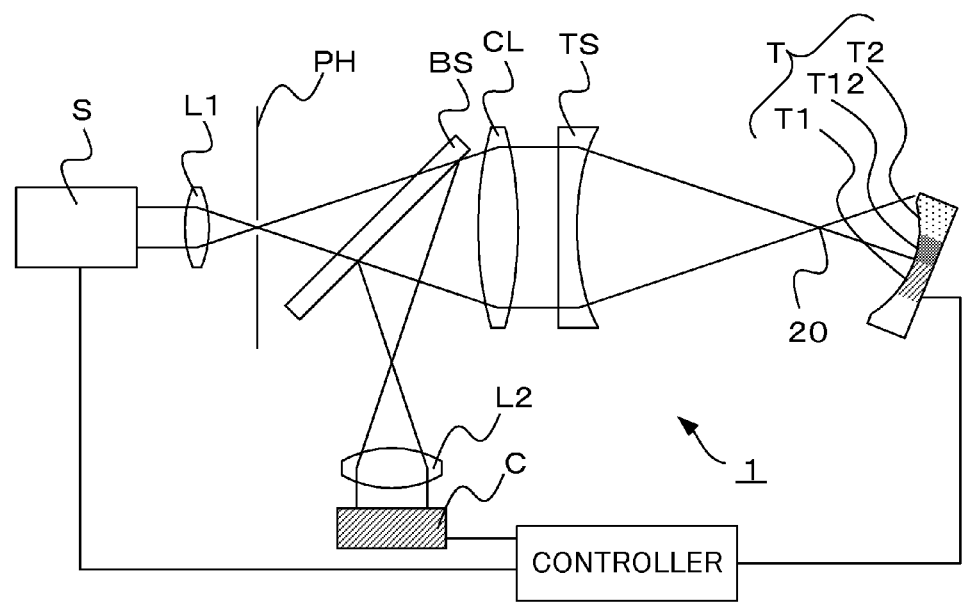
Figures 6A, 6B:
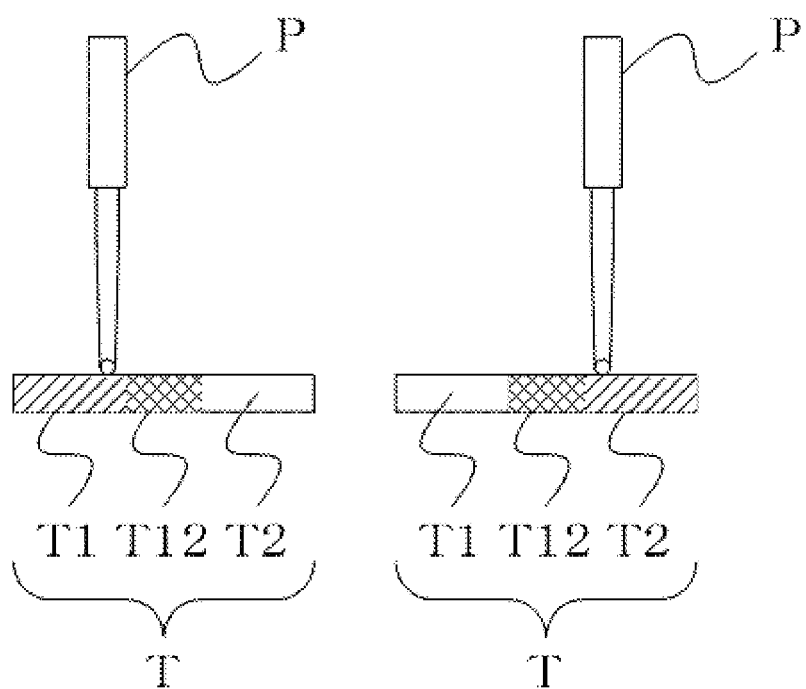
FIGS. 6A and 6B are configuration diagrams of a contact type measurement apparatus in the present embodiment.

However, even if any measurement method is used, in a case where the target T is huge or has an aspherical surface, only a part of the target T can be measured and a whole surface (an entire shape) of the target T can not be measured. Therefore, the target T needs to be moved to be divided into a plurality of partial regions T1 and T2 to measure each partial region. FIGS. 5A and 6A show a state where the partial region T1 is measured, and FIGS. 5B and 6B show a state where the partial region T2 is measured. In FIGS. 5A, 5B, 6A, and 6B, a region T12 is an overlapped region of the two partial regions T1 and T2. The overlapped region T12 is measured more than once by measuring the partial regions T1 and T2, and is an overlap width when stitching is performed for the partial regions T1 and T2. As shown in FIGS. 5A and 5B, when the target T has a nonplaner shape, a relative inclination as well as a position relation between the target T and the measurement apparatus needs to be adjusted.

Figure 7:
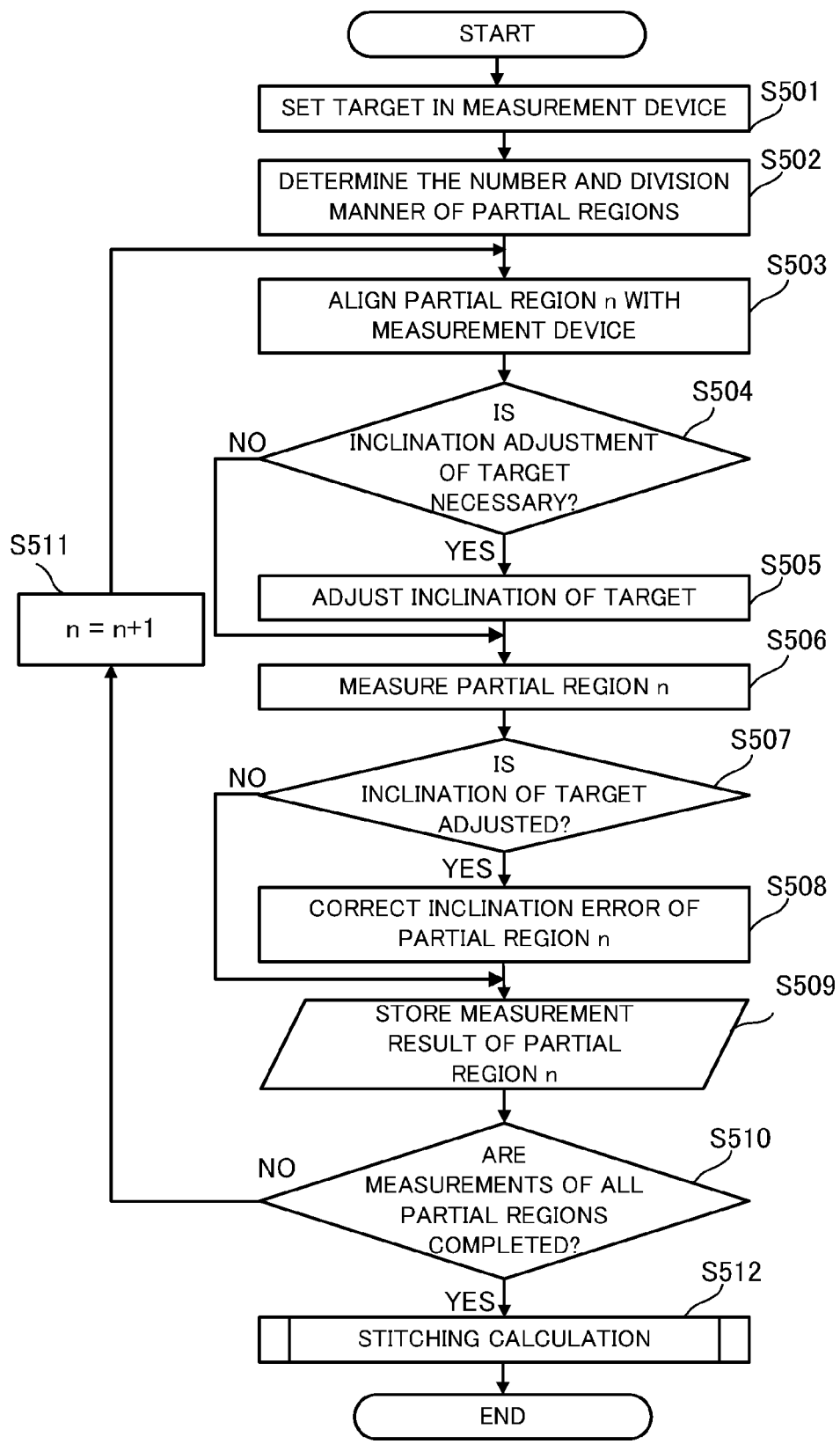
FIG. 7 is a flowchart of a partial region measurement in a measurement method of the present embodiment.
Figure 8:
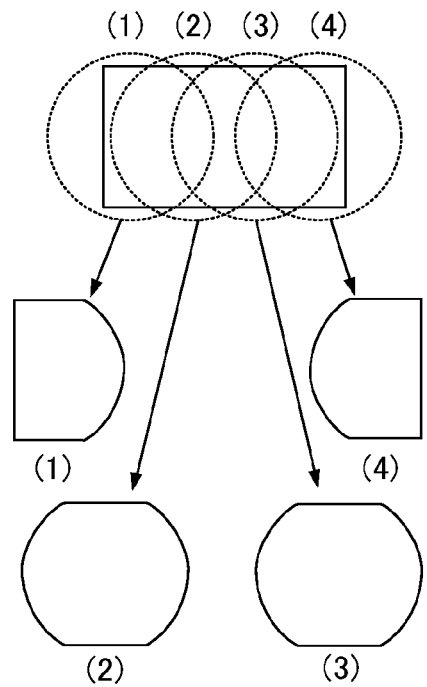
FIG. 8 is a division example of a plurality of partial regions.

Next, a flow of measuring the partial region in the measurement method of the present embodiment will be described. FIG. 7 is a flowchart of measuring the partial region. The measurement of the partial region shown in FIG. 7 is performed based on an instruction of a controller. See FIGS. 5A and 5B. First, in Step S501, the target is set up in a measurement device (the measurement apparatus). Next, in Step S502, the number of the partial regions and the way of dividing the regions are determined. In Step S503, a positioning between the partial region n and the measurement device is performed so as to be able to measure a predetermined partial region n (an initial value of "n" is 1, and its maximum value is the number of divisions defined in Step S502). Subsequently, in Step S504, whether or not the adjustment of the relative inclination between the target and the measurement device is necessary is determined. When the inclination adjustment is necessary, the flow proceeds to Step S505. On the other hand, when the inclination adjustment is not necessary, the flow proceeds to Step S506.

In Step S505, when it is determined that the inclination adjustment is necessary in Step S504, the inclination adjustment is performed. In Step S506, a measurement of the predetermined partial region n is performed. Next, in Step S507, whether or not the inclination adjustment has been performed in Step S505 is determined. When the inclination adjustment has been performed, the flow proceeds to Step S508. On the other hand, when the inclination adjustment has not been performed, the flow proceeds to Step S509. In Step S508, only in a case where it is determined that the inclination adjustment has been performed in Step S507, a correction is performed by a correction amount for a measurement result in Step S506.

In Step S509, the result obtained in Step S506 or S508 is stored as a shape of the partial region n. Next, in Step S510, whether or not all measurements of the partial regions defined in Step S502 have been completed is determined. When all measurements of the partial regions have not been completed, the flow proceeds to Step S511. On the other hand, all measurements of the partial regions have been completed, the flow proceeds to Step S512. In Step S511, a measuring object is changed from the partial region n to a next partial region n+1. Thus, Steps S501 to S511 are a partial region measurement step which is performed by a measurement unit (not shown). In Step S512, a stitching calculation of the plurality of measured partial regions is performed.

In the stitching calculation of the partial regions, a stitching of the partial regions obtained by the measurement of the partial regions described above is performed. When measuring a plurality of partial regions, in addition to an original shape of the target, a measurement result where a setting error different in each partial region from each other and a system error common to each partial region are added is obtained. In other words, the result is represented as the following Expression (1). In the embodiment, a case of four stitching is indicated as one example.

$$\Phi'_1 = \Phi_1 + \sum_{i=1}^{3} c_i^1 Z_i + \sum_{i=4}^{\infty} c_i Z_i \qquad (1)$$

$$\Phi'_2 = \Phi_2 + \sum_{i=1}^{3} c_i^2 Z_i + \sum_{i=4}^{\infty} c_i Z_i$$

$$\Phi'_3 = \Phi_3 + \sum_{i=1}^{3} c_i^3 Z_i + \sum_{i=1}^{\infty} c_i Z_i$$

$$\Phi'_4 = \Phi_4 + \sum_{i=1}^{3} c_i^4 Z_i + \sum_{i=1}^{\infty} c_i Z_i$$

In Expression (1), $\Phi_n$ indicates an original shape of the partial region n, $\Sigma c_i^n Z_i$ indicates a setting error of the partial regions n, and $\Sigma c_i Z_i$ indicates a system error. $\Phi_n'$ indicates an actually measured shape. The errors are represented by a Zernike polynomial, and $Z_i$ indicates a Zernike i-th term. $c_i''$ and $c_i$ are coefficients indicating the setting error and the system error, respectively. The setting error is represented by Zernike first to third terms (corresponding to piston and tilt components) when the target is plane. On the other hand, the setting error is represented by Zernike first to fourth terms (corresponding to piston, tilt, and spherical components) when the target is nonplanar. The system error is represented by Zernike higher-order terms equal to or more than a fourth term when the target is plane. On the other hand, the system error is represented by Zernike higher-order terms equal to or more than a fifth term when the target is nonplanar.

Figure 9A:
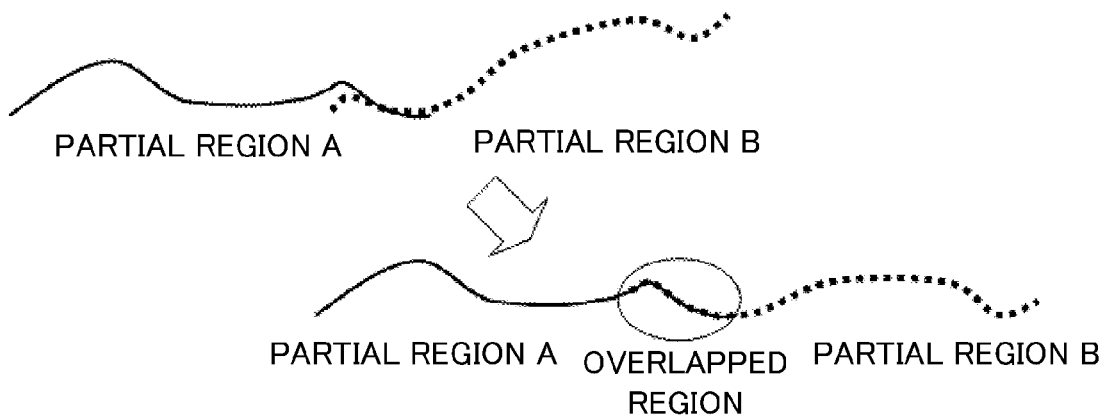
FIGS. 9A and 9B are illustrations of a stitching error in an overlapped region of partial regions.
Figure 9B:
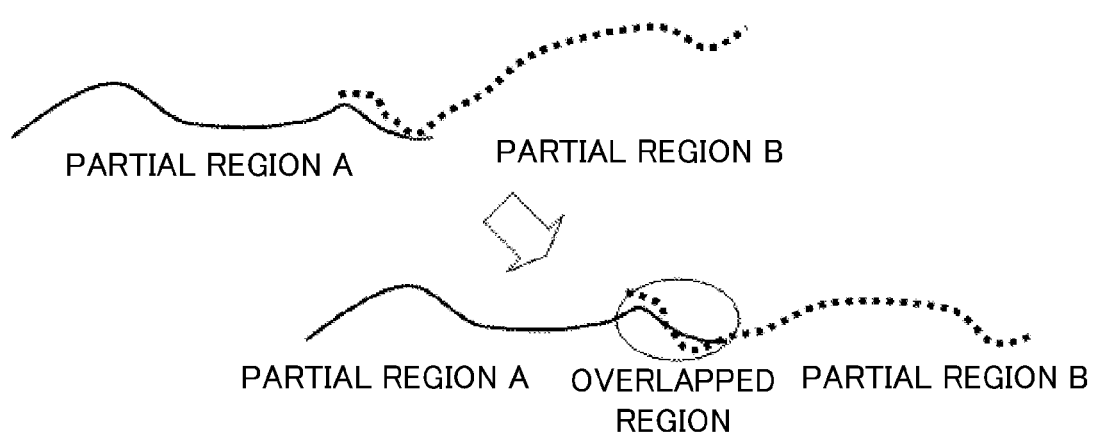

As shown in FIG. 9A, because the shapes of the overlapped region that is an overlap width are orignally an identical shape, the way of stitching the overlapped regions is uniquely determined and any error is not generated. However, actually, an error represented by Expression (1) is generated. Therefore, as shown in FIG. 9B, the way of stitching the overlapped regions can not be uniquely determined and the stitching error is generated. In order to reduce the error, the setting error and the system error are corrected. In other words, values of $c_i''$ and $c_i$ in Expression (1) are estimated to correct the setting error and the system error. In order to estimate these values, commonly, least quares method is used. In other words, a residual of each partial retion in an overlapped region is calculated to perform the correction so that sum of squares of the residual is at a minimum. In other words, the values of $c_i''$ and $c_i$ are calculated so that $\Delta$ represented by the following Expression (2) is at a minimum.

$$\Delta = \sum_{1 \cap 2}(\Phi'_2 - \Phi'_1)^2 + \sum_{1 \cap 3}(\Phi'_3 - \Phi'_1)^2 + \sum_{1 \cap 4}(\Phi'_4 - \Phi'_1)^2 + \qquad (2)$$
$$\sum_{2 \cap 1}(\Phi'_1 - \Phi'_2)^2 + \sum_{2 \cap 3}(\Phi'_3 - \Phi'_2)^2 + \sum_{2 \cap 4}(\Phi'_4 - \Phi'_2)^2 +$$
$$\sum_{3 \cap 1}(\Phi'_1 - \Phi'_3)^2 + \sum_{3 \cap 2}(\Phi'_2 - \Phi'_3)^2 + \sum_{3 \cap 4}(\Phi'_4 - \Phi'_3)^2 +$$

-continued
$$\sum_{4 \cap 1}(\Phi'_1 - \Phi'_4)^2 + \sum_{4 \cap 2}(\Phi'_2 - \Phi'_4)^2 + \sum_{4 \cap 3}(\Phi'_3 - \Phi'_4)^2$$

In other words, the values of $c_i''$ and $c_i$ by which $\Delta$ represented by the following Expression (2) is at a minimum are obtained by solving the following Expression (3).

$$\frac{\partial \Delta}{\partial c_i^j} = 0 \qquad (3)$$

$$\frac{\partial \Delta}{\partial c_i} = 0$$

The results are estimated values of the setting error and the system error. Although the system error itself is contained in the terms up to the infinite order term when it is represented by the Zernike polynomial, in an actual calculation, only terms up to a certain finite order term are used in order to reduce a calculation load. The embodiment performs the calculation using terms up to a thirty-sixth term of the Zernike polynomial, but is not limited to this and may increase the number of terms to be used for example.

In the present embodiment, the partial region measurement part and the stitching calculation part are independent of each other, and other arbitrary methods can be combined with each of the parts. The present embodiment performs an error correction using least squares method, but is not limited to this. For example, least biquadratic method may be used.

Embodiment 1

Next, a stitching calculation in a measurement method of Embodiment 1 will be described. FIG. 1 is a flowchart of the stitching calculation in the present embodiment. First, in Step S101, Partial regions that are to be references are selected from all partial regions of a target. In the embodiment, when the number of all the partial regions of the target is N and the number of the partial regions that are to be the references is M, the value of M can be set in a range of $2 \leq M \leq N$.

Next, in Step S102, a partial region m that is one of the M partial regions selected in Step S101 is set as a reference. In other words, an error (a setting error) caused by a position variability in measuring the partial region m is fixed, and the processing of the subsequent stitching calculation is performed. In the embodiment, an initial value of m is 1, and the value of m increases in a range of $1 \leq m \leq N$. Thus, Step S102 is a reference determination step which determines the error caused by the position variability in measuring an i-th partial region ("i" is an integer between 1 and N) of the N partial regions.

Next, in Step S103, an overlapped region of the partial regions adjacent to each other is extracted. In Step S104, a difference between the partial regions adjacent to each other in each overlapped region is calculated. In Step S105, a correction value by which the difference between the partial regions adjacent to each other obtained in Step S104 is at a minimum is calculated in a condition where the partial region m set in Step S102 is a reference. In other words, the error (the setting error) caused by the position variability in measuring the partial region m is fixed, and the setting error of other partial regions is variable. The system error is variable in all partial regions. In this condition, the difference (the error) in the overlapped region described above is calculated, and the correction value by which the error is at a minimum is obtained. In order to calculate the correction value for minimizing the difference (the error) in the overlapped region, the least squares method is used as described above. The present embodiment is not limited to this, but may use for example the least biquadratic method.

Thus, Step S105 is an error calculation step which calculates the error (the setting error) caused by the position variability in measuring the N−1 partial regions other than the i-th partial region and the error (the system error) caused by the measurement apparatus which is common to the N partial regions. In Step S105, the correction value is obtained so as to cancel these errors.

Next, in Step S106, in accordance with the correction value calculated in Step S105, the error correction is performed for each partial region. In other words, the correction depending on each error calculated in Step S105 is performed. In Step S107, after the error correction is performed in Step S106, the stitching between the partial regions adjacent to each other is performed. In other words, in Step S107, the N partial regions are stitched. In Step S108, the result of the stitching calculation in Step S107 is stored in a storage portion of the measurement apparatus as a calculation result in a condition where the partial region m is a reference.

In Step S109, whether or not the calculations for all the M reference partial regions selected in Step S101 have been completed is determined. When the calculations for all the M partial regions have not been completed, the flow proceeds to Step S110. On the other hand, when all the calculations have been completed, the flow proceeds to Step S111. In Step S110, the reference is changed from the partial region m to the next partial region m+1. By Step S110, Steps S102 to S109 are repeatedly performed M times ("M" is an integer between 2 and N) by changing "i" described above.

In Step S111, a result indicating an abnormal value out of the calculation results obtained in Step S108 is searched. An RMS value (an effective value) relating to each result of the stitching calculation by using each reference and an average of these RMS values are calculated. The result different by at least 10% from the average out of the RMS values of the result obtained by performing the stitching by using each reference is defined as an abnormal value. When the abnormal value (peculiar data) is generated, the flow proceeds to Step S112. On the other hand, when the abnormal value is not generated, the flow proceeds to Step S113. In Step S112, the abnormal value found in Step S111 is excluded.

Finally, in Step S113, an average value of the calculation results from which the abnormal value is excluded in Step S112 is calculated from the calculation results by using each reference stored in the storage portion in Step S108. Thus, Step S113 is a whole shape measurement step which defines the average value of the M stitching results obtained by repeating M times as a measured value of the target. More specifically, it is a whole shape measurement step which defines the average value of the results obtained by excluding the abnormal value of the M stitching results as a measured value of the target. Thus, according to the measurement method of the present embodiment, the stitching calculation can be performed with high accuracy.

Embodiment 2

Figure 2:
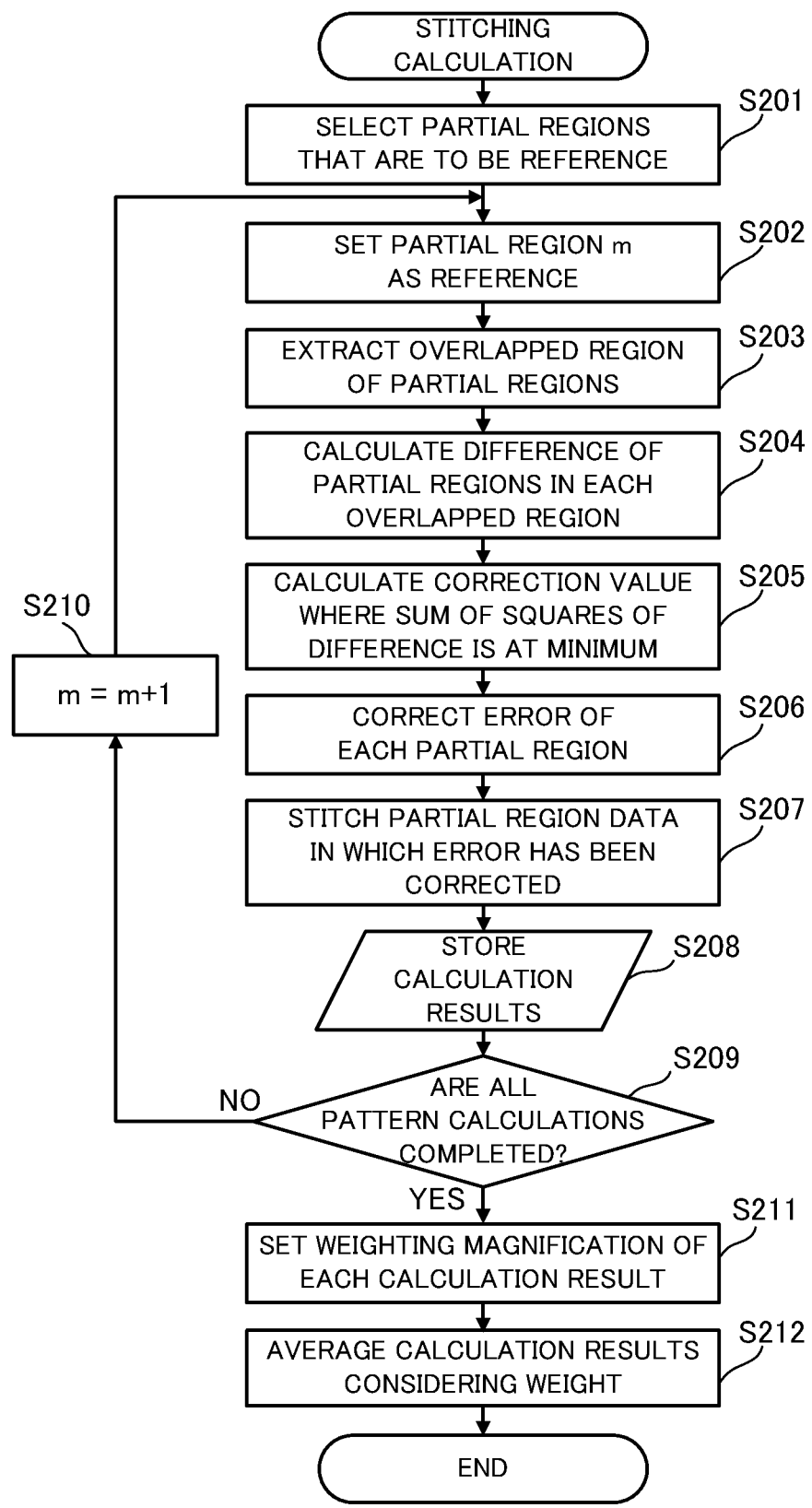
FIG. 2 is a flowchart of a stitching calculation in a measurement method of Embodiment 2.

Next, a stitching calculation in a measurement method of Embodiment 2 will be described. FIG. 2 is a flowchart of a stitching calculation in the present embodiment. In the present embodiment, Steps S201 to S210 in FIG. 2 are the same as Steps S101 to S110 of Embodiment 1 (FIG. 1), and therefore descriptions thereof will be omitted.

In Step S209, when calculations of all partial regions that are candidates of M references selected in Step S201 have been completed, the flow proceeds to Step S211. In Step S211, a predetermined weighting magnification (a weighting coefficient) is set to each calculation result obtained in Step S208. For example, when the number of division is four in one dimension in an x-axis direction, it is estimated that there is a high possibility that a result closest to a true value is obtained by setting two center partial regions as references, and therefore the weighting magnifications of the results obtained by setting the two center partial regions as references are increased. In the present embodiment, the weighting magnification for all calculation results may also be set to a constant value of 1.

Next, in Step S212, considering the weighting magnification set in Step S211, an average value of the calculation results obtained by using each reference is calculated. For example, the weighting magnifications of the calculation results (results (1), (2), (3), and (4)) obtained by setting four partial regions (1), (2), (3), and (4) as references are set to 1, 2, 2, and 1, respectively. In this case, the average value obtained by considering the weighting magnification can be calculated as follows.

$$(result(1)+result(2)\times 2+result(3)\times 2+result(4))/6$$

Thus, Step S212 is a whole shape measurement step which defines the average value obtained by weighting the M stitching results as the measured value of the target. According to the measurement method of the present embodiment, because a predetermined weighting magnification is used, the stitching calculation can be performed with higher accuracy.

Embodiment 3

Figure 3:
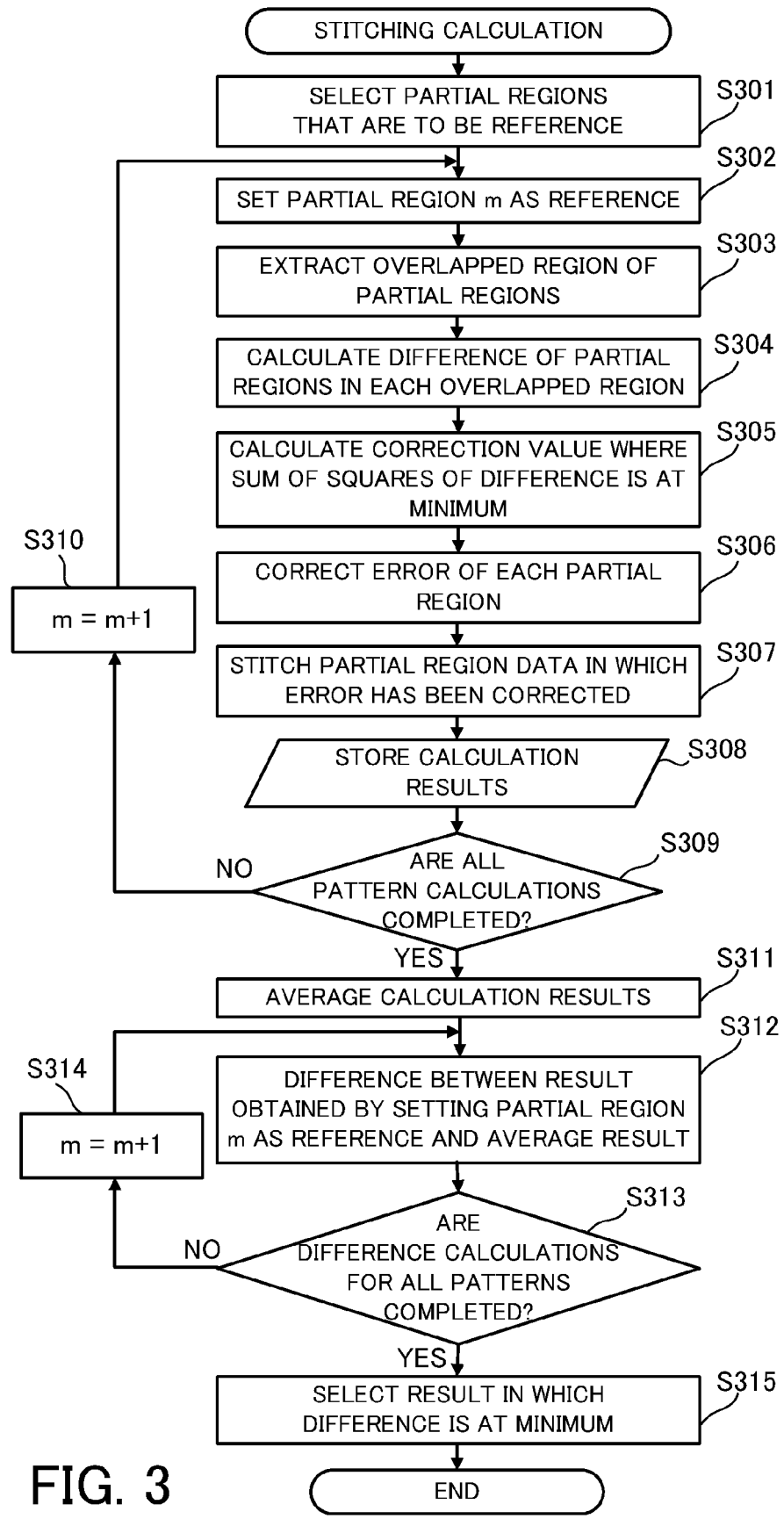
FIG. 3 is a flowchart of a stitching calculation in a measurement method of Embodiment 3.

Next, a stitching calculation in a measurement method of Embodiment 3 will be described. FIG. 3 is a flowchart of the stitching calculation in the present embodiment. In the present embodiment, Steps S301 to S310 in FIG. 3 are the same as Steps S101 to S110 of Embodiment 1 (FIG. 1) and therefore descriptions thereof will be omitted.

In Step S309, when it is determined that calculations of all partial regions that are candidates of M references selected in Step S301 have been completed, in Step S311, an average value of the calculation results obtained by using each reference stored in Step S308 is calculated. In Step S312, the difference between the average value obtained in Step S311 and the calculation result obtained by setting a partial region m as a reference is calculated.

Next, in Step S313, it is determined whether or not the differences for all partial regions that are candidates of the M references selected in Step S301 have been calculated in Step S312. When the differences for all the M partial regions have not been calculated, the flow proceeds to Step S314. On the other hand, when the differences for all the partial regions have been calculated, the flow proceeds to Step S315. In Step S314, the reference of the calculation result obtained by calculating the difference with respect to the average value is changed to a subsequent reference. In Step S315, the result which has the smallest difference with respect to the average value out of the calculation results obtained by using each reference is defined as a measurement result.

Thus, Steps S311 to S315 are a whole shape measurement step which calculates the average value of the M stitching results and the differences between the M stitching results and the average value to defining the stitching result whose difference is the smallest as a measured value of the target. As described above, according to the measurement method of the present embodiment, the stitching calculation can be performed with high accuracy.

Embodiment 4

Figure 4:
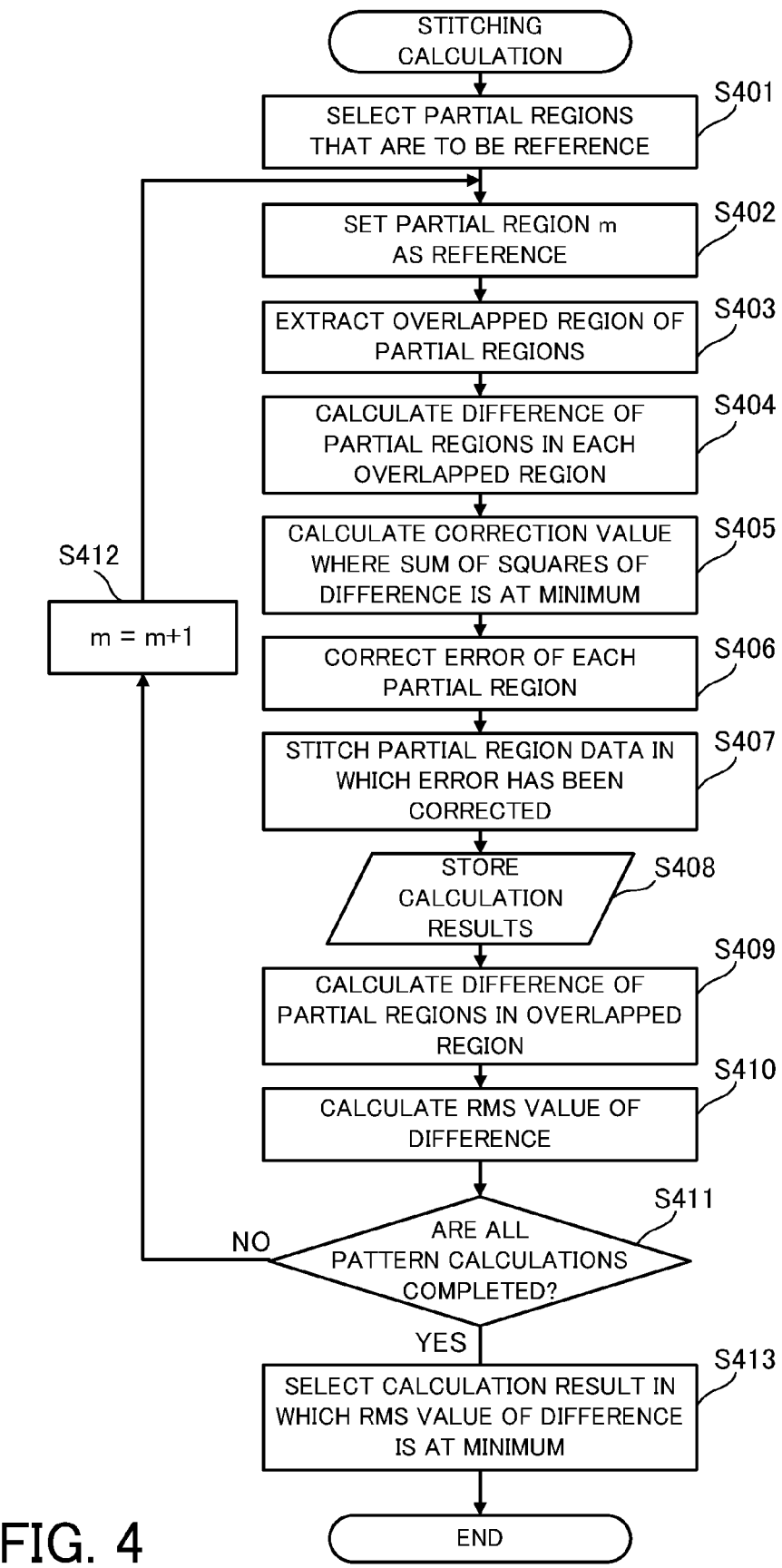
FIG. 4 is a flowchart of a stitching calculation in a measurement method of Embodiment 4.

Next, a stitching calculation in a measurement method of Embodiment 4 will be described. FIG. 4 is a flowchart of the stitching calculation in the present embodiment. In the present embodiment, Steps S401 to S408 in FIG. 4 are the same as Steps S101 to S108 of Embodiment 1 (FIG. 1) and therefore descriptions thereof will be omitted.

In Step S409, a residual of an overlapped region of partial regions adjacent to each other is calculated for a calculation result (a result obtained by performing a stitching by setting a partial resion m as a reference) stored in Step S408. In Step S410, the residual RMS value calculated in Step S409 is calculated. Next, in Step S411, it is determined whether or not calculations for all partial regions that are candidates of M references selected in Step S401 have been completed. When the calculations have not been completed, the flow proceeds to Step S412. On the other hand, when the calculations have been completed, the flow proceeds to Step S413.

In Step S412, the partial region as a reference is changed to the next partial region. In Step S413, the result in which the RMS value calculated in Step S410 is the smallest out of the calculation results stored in Step S408 is adopted as a measurement result. Thus, Steps S409 to S413 are a whole shape measurement step which calculates sum of squares of the difference of the calculation result in the overlapped region of the partial regions adjacent to each other of the M stitching results, and defines the stitching result where the sum of squares is at the minimum as a measured value of the target. As described above, according to the measurement method of the present embodiment, the stitching calculation can be performed with high accuracy.

According to each of the above embodiments, a measurement method capable of performing a stitching calculation with high accuracy is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-049734, filed on Mar. 3, 2009, which is hereby incorporated by reference herein in its entirety.

What is claimed is:

1. A measurement method of measuring a target divided into N partial regions, where "N" is an integer of at least 2, to measure a whole shape of the target by stitching the N partial regions, with a measuring apparatus having a controller, the measurement method comprising:
   a partial region measurement step of measuring the N partial regions so that each of the N partial regions includes an overlapped region with at least one of the other (N−1) partial regions;
   a setting step of setting, as a reference region, one partial region among the N partial regions;
   a reference determination step of determining an error caused by a position variability in measuring the reference region;
   an error calculation step of calculating errors, using a controller, caused by the position variability in measuring (N−1) partial regions other than the reference region, and error caused by a measurement apparatus common to the N partial regions;
   a stitching step of performing a correction depending on each error calculated by the error calculation step, and of stitching the N partial regions to obtain the one whole shape of the target;
   wherein the reference determination step, the error calculation step, and the stitching step are repeatedly performed while setting, as the reference region, M partial regions among the N partial regions one by one to obtain M whole shapes of the target M times by changing the i, where "M" is an integer between 2 and N; and a whole shape measurement step of obtaining a measured value of the whole shape of the target based on the M whole shapes of the target.

2. A measurement method according to claim 1, wherein the error calculation step calculates each of the errors using a least squares method.

3. A measurement method according to claim 1, wherein the whole shape measurement step defines an average value of the M whole shapes as the measured value of the whole shape of the target.

4. A measurement method according to claim 1, wherein the whole shape measurement step defines an average value obtained by weighting the M whole shapes as the measured value of the whole shape of the target.

5. A measurement method according to claim 1, wherein the whole shape measurement step calculates an average value of the M whole shapes and differences between the M whole shapes and the average value to define a stitching result in which the difference is at the minimum as the measured value of the whole shape of the target.

6. A measurement method according to claim 1, wherein the whole shape measurement step calculates sum of squares of a calculation result of a difference of the partial regions adjacent to each other in the overlapped region using the M whole shapes to define a stitching result in which the sum of squares is at the minimum as the measured value of the whole shape of the target.

7. A measurement method according to claim 1, wherein the whole shape measurement step defines an average value of results obtained by excluding an abnormal value out of the M whole shapes as the measured value of the whole shape of the target.

8. A measurement method according to claim 1, wherein each of the errors is calculated using Zernike polynomial.

9. A measurement apparatus for measuring a target divided into N partial regions, where "N" is an integer of at least 2, to measure a whole shape of the target by stitching the N partial regions, the measurement apparatus comprising:
   a controller programmed to:
   measure the N partial regions so that each of the N partial regions includes an overlapped region with at least one of the other (N−1) partial regions;
   set, as a reference region, one partial region among the N partial regions;
   determine an error caused by a position variability in measuring the reference region;
   calculate errors caused by the position variability in measuring (N−1) partial regions other than the reference region and error caused by a measurement apparatus common to the N partial regions;
   perform a correction depending on each calculated error to stitch the N partial regions to obtain one whole shape of the target, and wherein the controller is programmed to repeatedly measure the N partial regions, determine the error, and stich the N partial regions while setting, as the reference region, M partial regions among the N partial regions one-by-one to obtain M whole shapes of the target, where "M" is an integer between 2 and N; and obtain a measured value of the whole shape of the target based on the M whole shapes of the target.

* * * * *